US011838782B2

(12) United States Patent
Pezeshki et al.

(10) Patent No.: US 11,838,782 B2
(45) Date of Patent: Dec. 5, 2023

(54) MEASUREMENTS ON A FIRST BAND APPLICABLE TO PROCEDURES ON A SECOND BAND

(71) Applicant: QUALCOMM Incorporated, San Diego, CA (US)

(72) Inventors: Hamed Pezeshki, San Diego, CA (US); Tao Luo, San Diego, CA (US); Taesang Yoo, San Diego, CA (US); Arumugam Chendamarai Kannan, San Diego, CA (US); Sony Akkarakaran, Poway, CA (US); Jingchao Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 17/159,548

(22) Filed: Jan. 27, 2021

(65) Prior Publication Data

US 2021/0243632 A1 Aug. 5, 2021

Related U.S. Application Data

(60) Provisional application No. 62/968,917, filed on Jan. 31, 2020.

(51) Int. Cl.
*H04W 24/10* (2009.01)
*H04W 72/0453* (2023.01)
(Continued)

(52) U.S. Cl.
CPC ............ *H04W 24/10* (2013.01); *G06N 20/00* (2019.01); *H04W 72/0453* (2013.01);
(Continued)

(58) Field of Classification Search
CPC ............. H04W 24/10; H04W 72/0413; H04W 72/0453; H04W 76/27; H04W 80/02;
(Continued)

(56) References Cited

U.S. PATENT DOCUMENTS 8,588,768 B2 * 11/2013 Ben-Eli ................ H04B 17/318
370/278
9,521,571 B2 * 12/2016 Yilmaz ................ H04B 17/318
(Continued)

FOREIGN PATENT DOCUMENTS

| WO | WO-2014126519 A1 * | 8/2014 | ......... H04L 25/0226 |
|---|---|---|---|
| WO | 2016036840 A1 | 3/2016 | |
| WO | 2019036184 A1 | 2/2019 | |

OTHER PUBLICATIONS

International Search Report and Written Opinion—PCT/US2021/015529—ISA/EPO—dated May 14, 2021.
(Continued)

*Primary Examiner* — Brian T O Connor
(74) *Attorney, Agent, or Firm* — Patterson & Sheridan LLP

(57) ABSTRACT

Certain aspects of the present disclosure provide techniques for measurements on a first frequency band applicable to procedures on a second frequency band. A technique that may be performed by a user equipment (UE) may include sending a base station (BS) an indication of the first frequency band, which may be a preferred measurement frequency band. The UE may then measure one or more reference signals (RSs) on the preferred measurement frequency band. The UE may then apply the measurements of the one or more RSs on the preferred measurement frequency band for one or more procedures on the second frequency band.

16 Claims, 9 Drawing Sheets

(51) Int. Cl.
  *G06N 20/00* (2019.01)
  *H04W 76/27* (2018.01)
  *H04W 80/02* (2009.01)
  *H04W 72/21* (2023.01)
  *H04N 21/466* (2011.01)
  *H04B 17/391* (2015.01)
  *H04L 41/16* (2022.01)
  *G10L 19/04* (2013.01)

(52) U.S. Cl.
  CPC ........... *H04W 72/21* (2023.01); *H04W 76/27* (2018.02); *H04W 80/02* (2013.01); *G10L 19/04* (2013.01); *H04B 17/3912* (2015.01); *H04B 17/3913* (2015.01); *H04L 41/16* (2013.01); *H04N 21/4666* (2013.01)

(58) Field of Classification Search
  CPC ........... H04W 36/0083; H04W 72/042; H04W 16/14; H04W 84/045; G06N 20/00; G06N 3/0445; G06N 3/0454; G06N 3/084; H04L 1/0026; H04L 1/0028; H04L 5/0048; H04L 1/0031
  See application file for complete search history.

(56) References Cited

U.S. PATENT DOCUMENTS

| | | | | |
|---|---|---|---|---|
| 9,762,456 | B2* | 9/2017 | Mismar | H04L 43/067 |
| 9,883,528 | B2* | 1/2018 | Nammi | H04B 7/0413 |
| 10,149,214 | B2* | 12/2018 | Lu | H04W 48/20 |
| 10,439,775 | B2 | 10/2019 | Mirbagheri et al. | |
| 10,574,321 | B2* | 2/2020 | Nilsson | H04B 7/0626 |
| 10,673,546 | B2* | 6/2020 | Bedekar | H04W 24/10 |
| 11,057,129 | B2* | 7/2021 | Bedekar | H04B 17/327 |
| 11,334,807 | B1* | 5/2022 | O'Shea | G06N 20/00 |
| 11,395,159 | B2* | 7/2022 | Lee | H04W 24/02 |
| 11,581,929 | B2* | 2/2023 | Guo | H04L 5/0053 |
| 11,595,847 | B2* | 2/2023 | Pezeshki | H04B 7/0626 |
| 11,646,838 | B2* | 5/2023 | Pezeshki | H04W 4/06 370/329 |
| 2016/0142927 | A1 | 5/2016 | Yilmaz et al. | |
| 2018/0332567 | A1 | 11/2018 | John Wilson et al. | |
| 2020/0252142 | A1* | 8/2020 | Bedekar | H04W 24/10 |
| 2021/0006989 | A1* | 1/2021 | Lee | H04W 24/02 |
| 2021/0119681 | A1* | 4/2021 | Seo | G06N 3/0454 |
| 2021/0243073 | A1* | 8/2021 | Pezeshki | H04L 41/0668 |
| 2021/0273707 | A1* | 9/2021 | Yoo | H04L 1/0072 |
| 2022/0217021 | A1* | 7/2022 | Pezeshki | H04L 5/0048 |
| 2022/0338189 | A1* | 10/2022 | Madadi | H04W 72/0446 |
| 2022/0352952 | A1* | 11/2022 | Tian | H04L 25/0224 |
| 2022/0385516 | A1* | 12/2022 | Atungsiri | H04L 27/26025 |

OTHER PUBLICATIONS

Mismar F.B., et al., "Machine Learning Approach to Estimating mmWave Signal Measurements During Handover," arxiv.org, Cornell University Library, 201 OLIN Library Cornell University Ithaca, NY 14853, Oct. 5, 2017 (Oct. 5, 2017), XP080826263, 4 pages, Chapters I-V.

* cited by examiner

MEASUREMENTS ON A FIRST BAND APPLICABLE TO PROCEDURES ON A SECOND BAND

CROSS-REFERENCE TO RELATED APPLICATION

This application claims benefit of and priority to U.S. Provisional Patent Application No. 62/968,917, filed Jan. 31, 2020, which is hereby incorporated by reference in its entirety.

BACKGROUND

Field of the Disclosure

Aspects of the present disclosure relate to wireless communications, and more particularly, to techniques for measurements on a first frequency band applicable to procedures on a second frequency band.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved and desirable user equipment (UE) measurements on a first frequency band applicable to procedures on a second frequency band.

Certain aspects of the subject matter described in this disclosure can be implemented in a method for wireless communication by a UE. The method generally includes sending a base station (BS) an indication of a preferred measurement frequency band. The method generally includes measuring one or more reference signals (RSs) on the preferred measurement frequency band. The method generally includes applying the measurements of the one or more RSs on the preferred measurement frequency band for one or more procedures on a second frequency band.

Certain aspects of the subject matter described in this disclosure can be implemented in a method for wireless communication by a user BS. The method generally includes receiving an indication of a preferred measurement frequency band from a UE. The method generally includes sending the UE a configuration of resources for the preferred measurement frequency band. The method generally includes sending the UE one or more RSs on the preferred measurement frequency band.

Certain aspects of the subject matter described in this disclosure can be implemented in an apparatus for wireless communications. The apparatus may include a memory and at least one processor coupled with the memory. The memory may include code executable by the at least one processor to cause the apparatus to: send a BS an indication of a preferred measurement frequency band; measure one or more RSs on the preferred frequency measurement band; and apply the measurements of the one or more RSs on the preferred measurement frequency band for one or more procedures on a second frequency band.

Certain aspects of the subject matter described in this disclosure can be implemented in an apparatus for wireless communications. The apparatus may include a memory and at least one processor coupled with the memory. The memory may include code executable by the at least one processor to cause the apparatus to: receive an indication of a preferred measurement frequency band from a UE; send the UE a configuration of resources for the preferred measurement frequency band; and send the UE one or more RSs on the preferred measurement frequency band.

Certain aspects of the subject matter described in this disclosure can be implemented in an apparatus for wireless communications. The apparatus may include means for sending a BS an indication of a preferred measurement frequency band; means for measuring one or more RSs on the preferred measurement frequency band; and means for applying the measurements of the one or more RSs on the preferred measurement frequency band for one or more procedures on a second frequency band.

Certain aspects of the subject matter described in this disclosure can be implemented in an apparatus for wireless communications. The apparatus may include means for receiving an indication of a preferred measurement frequency band from a UE; means for sending the UE a configuration of resources for the preferred measurement frequency band; and means for sending the UE one or more RSs on the preferred measurement frequency band.

Certain aspects of the subject matter described in this disclosure can be implemented in a computer readable medium storing computer executable code thereon for wireless communications. The computer readable medium comprises code for sending a BS an indication of a preferred measurement frequency band; code for measuring one or more RSs on the preferred measurement frequency band; and code for applying the measurements of the one or more RSs on the preferred measurement frequency band for one or more procedures on a second frequency band.

Certain aspects of the subject matter described in this disclosure can be implemented in a computer readable medium storing computer executable code thereon for wireless communications. The computer readable medium comprises code for receiving an indication of a preferred measurement frequency band from a UE; code for sending the UE a configuration of resources for the preferred measurement frequency band; and code for sending the UE one or more RSs on the preferred measurement frequency band.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
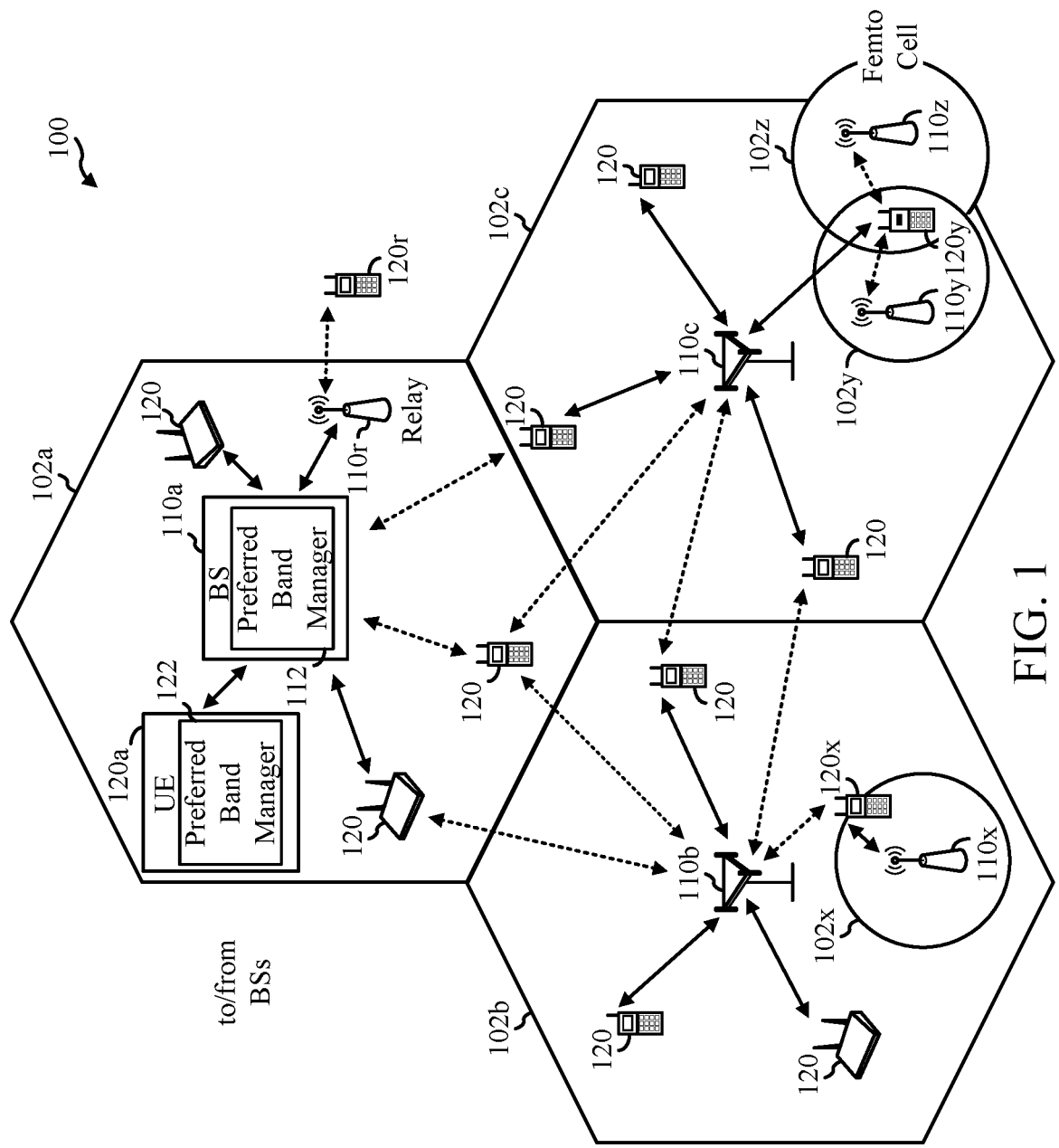
FIG. 1 is a block diagram conceptually illustrating an example telecommunications system, in accordance with certain aspects of the present disclosure.
Figure 1:
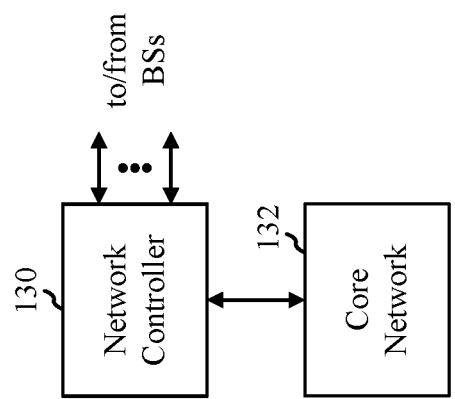

Aspects of the present disclosure provide apparatus, methods, processing systems, and computer readable mediums for user equipment (UE) measurements on a first band (e.g., a first frequency band) applicable to procedures on a second band (e.g., a second frequency band). As used herein, a "radio frequency band" may be referred to as a "frequency band" or a "band".

In certain wireless communication systems, a technique may be implemented where machine learning (ML) models are utilized to predict channel characteristics in a second band based on measurements of reference signals (RSs) in a first band. This technique may provide several advantages. For example, measurements of the RSs in the first band (e.g., the sub-6 GHz band, also sometimes referred to as FR1) may be simpler and more power efficient than performing the measurements of the RSs in a different band (e.g., the millimeter wave (mmWave) band, also sometimes referred to as FR2). This may be due to hardware characteristics of a UE. Also, the measurements of the RSs in the second band may be reduced or eliminated by using the measurements of the RSs from the first band, thus, reducing measuring overhead in the second band.

According to aspects of the present disclosure, the UE can perform RS measurements in a first band and apply the measurements to procedures on at least one other band based the measurements in the first band. In some examples, the UE can indicate a preferred measurement band to a base station (BS), and the BS can configure the UE with resources for the preferred measurement band. In some examples, the BS can further configure the other bands that the measurements on the preferred measurement band can be applied to. In some examples, the UE can report the measurements in the preferred measurement band to the BS and the UE may indicate the other bands to which the UE applies measurements.

The following description provides examples of UE measurements on a first band applicable to procedures on a second band in wireless communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Example Wireless Communications System

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

New radio (NR) access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

NR supports beamforming and beam direction may be dynamically configured. Multiple input multiple output (MIMO) transmissions with precoding may also be supported. MIMO configurations in a downlink (DL) may support up to 8 transmit antennas with multi-layer DL transmissions up to 8 streams and up to 2 streams per user equipment (UE). Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and the UEs 120 may be configured for measurements on a first band (e.g., a first frequency band) applicable to procedures on a second band (e.g., a second frequency band). As shown in FIG. 1, the BS 110a includes a preferred band manager 112 and the UE 120a includes a preferred band manager 122. The preferred band manager 112 and/or the preferred band manager 122 may be configured for measurements on a preferred measurement band applicable to procedures on another band, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS 110 may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. The wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between the UEs 120, to facilitate communication between devices.

A network controller 130 may be in communication with a set of BSs 110 and provide coordination and control for these BSs 110 (e.g., via a backhaul). In aspects, the network controller 130 may be in communication with the core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
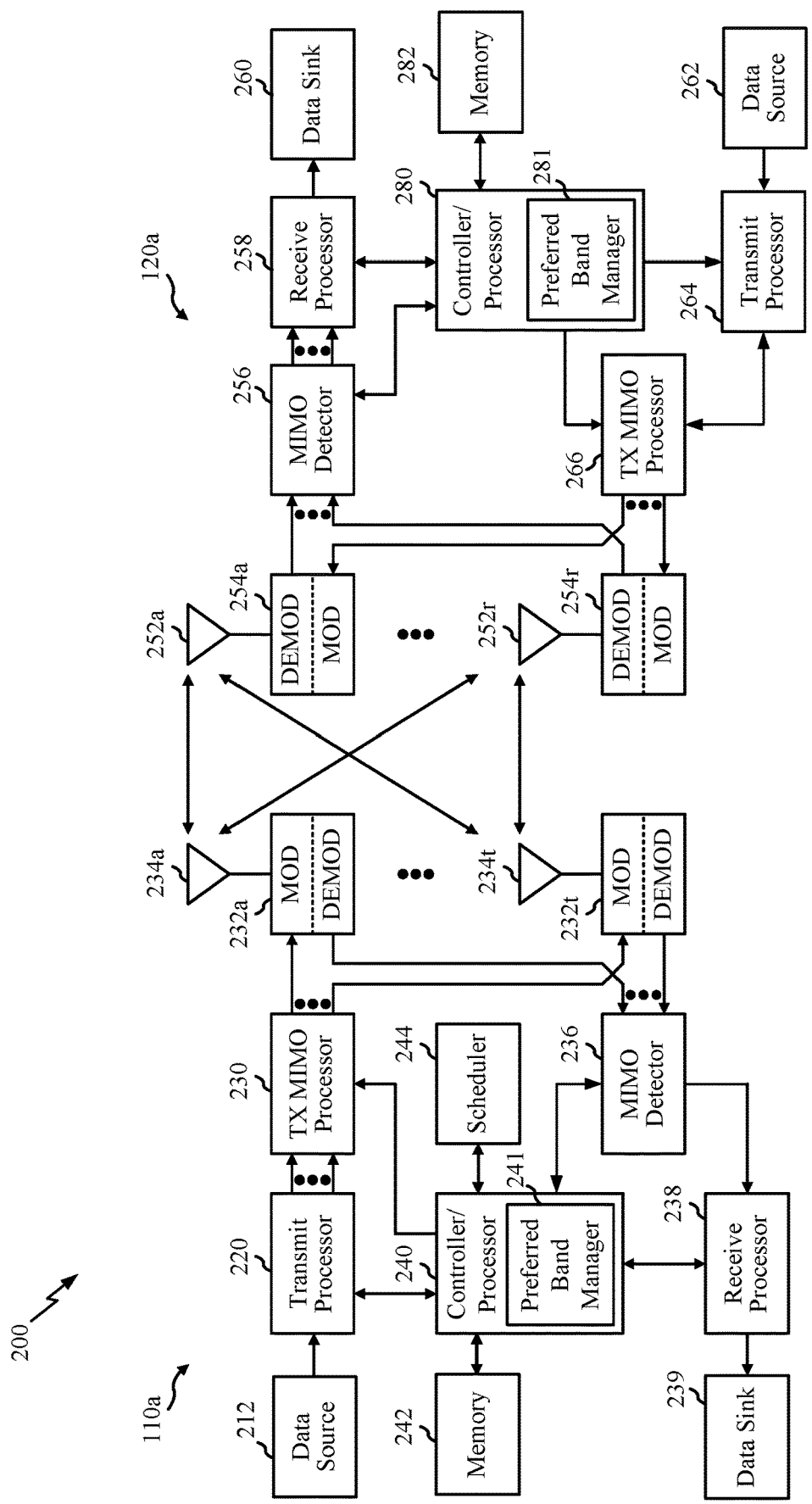
FIG. 2 is a block diagram conceptually illustrating a design of an example base station (BS) and a user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ indicator channel (PHICH), a physical downlink control channel (PDCCH), a group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for OFDM, etc.) to obtain an output sample stream. Each MOD in transceivers 232a-232t may further process (e.g., convert to analog, amplify, filter, and upconvert) the output sample stream to obtain a DL signal. DL signals from MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in transceivers 254a-254r may condition (e.g., filter, amplify, downconvert, and digitize) a respective received signal to obtain input samples. Each DEMOD in transceivers 254a-254r may further process the input samples (e.g., for OFDM, etc.) to obtain received symbols. A MIMO detector 256 may obtain received symbols from all the DEMODs in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for the PUSCH) from a data source 262 and control information (e.g., for a physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the DEMODs in transceivers 254a-254r (e.g., for SC-FDM, etc.), and transmitted to the BS 110a. At the BS 110a, the UL signals from the UE 120a may be received by the antennas 234, processed by the MODs in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or the UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a preferred band manager 241 that may be configured for measurements on a preferred measurement band applicable to procedures on another band, according to aspects described herein. As shown in FIG. 2, the controller/processor 280 of the UE 120a has a preferred band manager 281 that may be configured for measurements on a preferred measurement band applicable to procedures on another band, according to aspects described herein. Although shown at the controller/processor, other components of the UE 120a and the BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
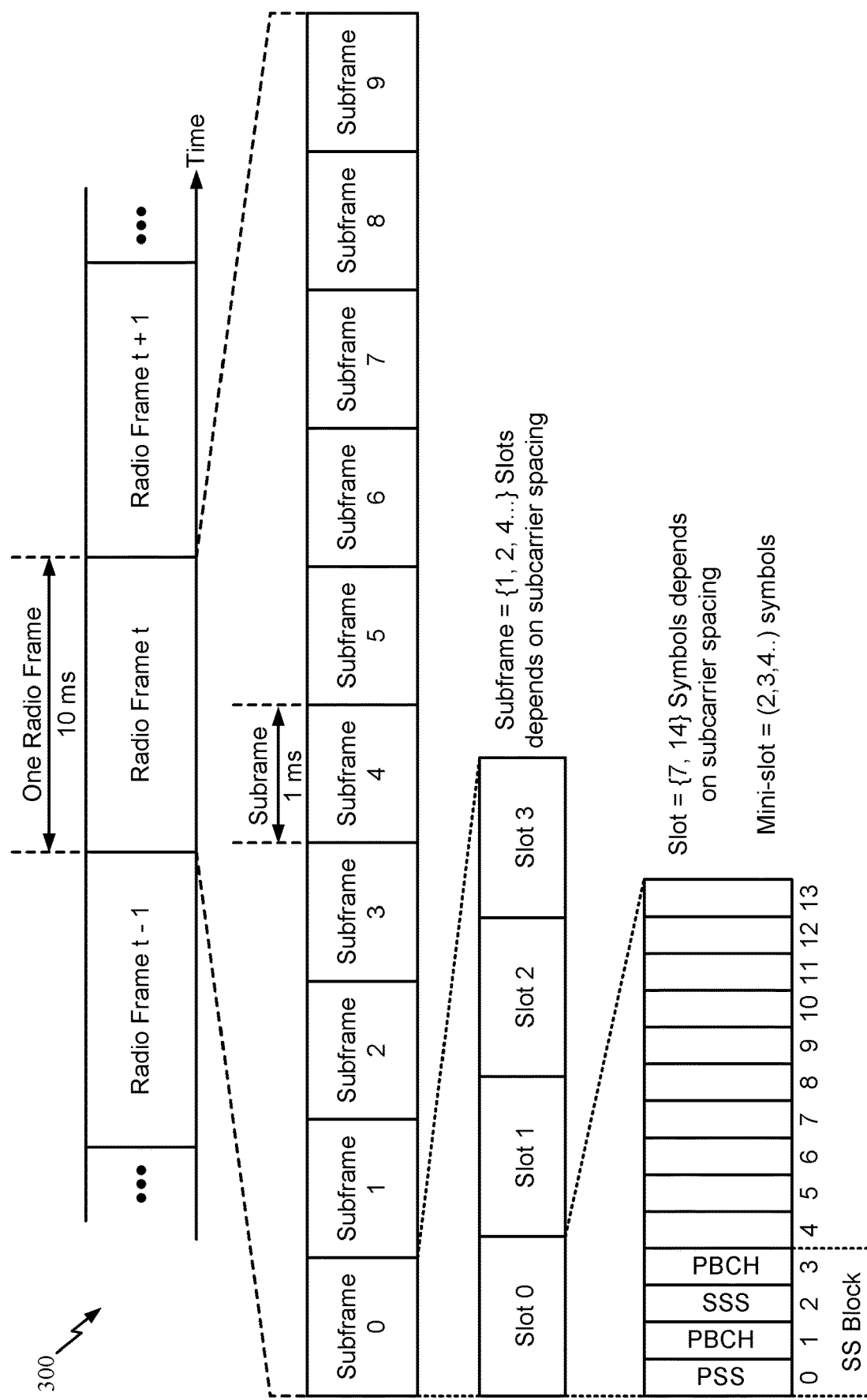
FIG. 3 is an example frame format for a new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, a UE and a BS operate in a same environment; however, the UE may operate in different frequencies having different channel properties. There may be some cross-frequency correlation between channel characteristics in different bands. In certain wireless communication systems, machine learning (ML) techniques can be utilized to predict channel characteristics in a second radio band (e.g., a second frequency band) based on measurements in a first band (e.g., a first radio frequency band).

In some examples, the ML techniques involve training a model, such as a predictive ML model. The model may be used to predict the channel characteristics in the second band based on the measurements in the first band. The model may be trained based on training data (e.g., training information), which may include feedback, such as feedback associated with the measurements in the first band compared to measurements in the second band.

Figure 4A:
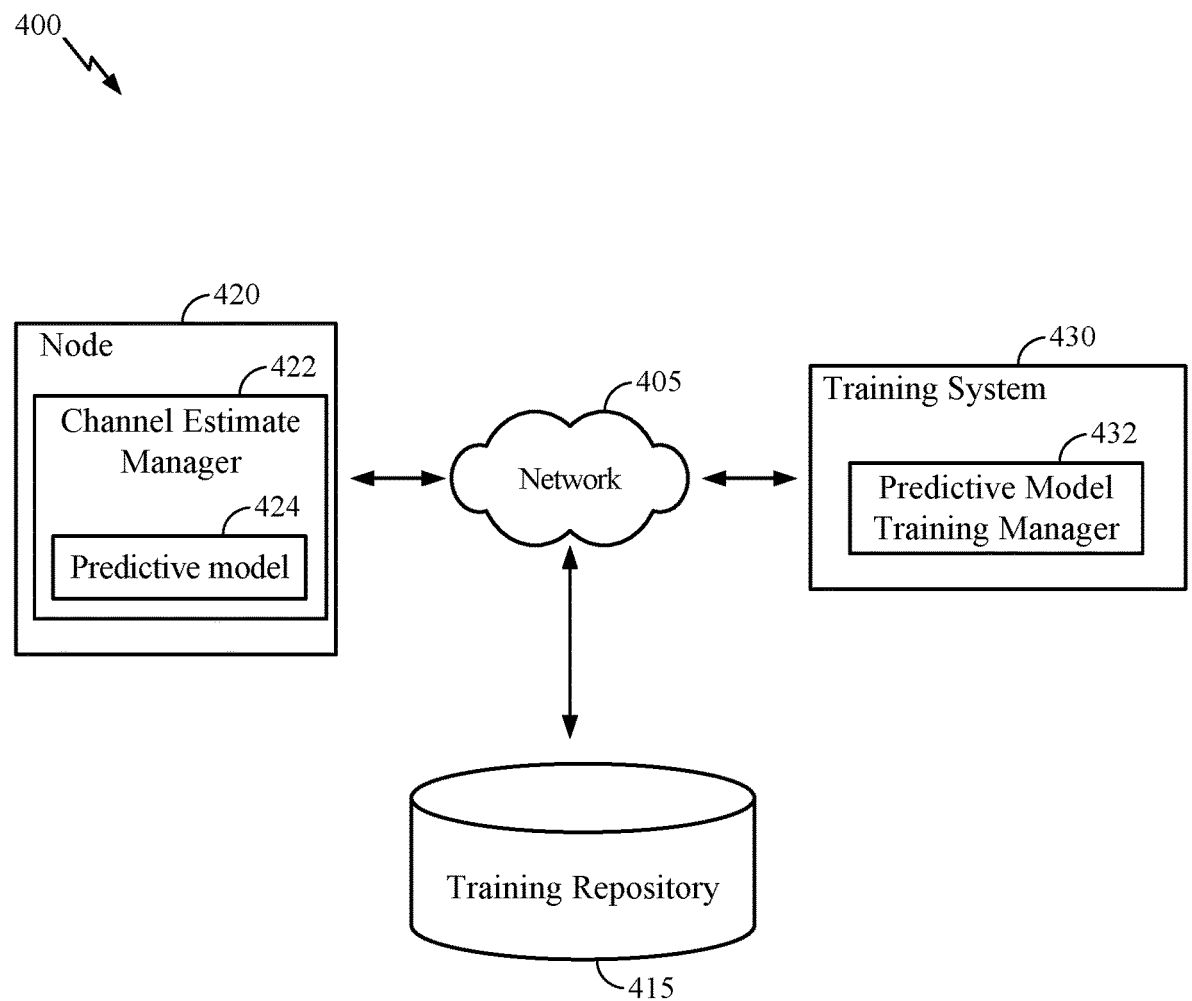
FIG. 4A illustrates an example networked environment in which a predictive model is used for channel estimates, in accordance with certain aspects of the present disclosure.

FIG. 4A illustrates an example networked environment 400 in which a predictive model 424 is used for channel estimation, according to certain aspects of the present disclosure. As shown in FIG. 4A, the networked environment 400 includes a node 420, a training system 430, and a training repository 415, communicatively connected via a network 405. The node 420 may be a UE (e.g., such as the UE 120a in the wireless communication network 100), and may include a channel estimate manager 422. The network 405 may be a wireless network such as the wireless communication network 100, which may be a 5G NR network. While the training system 430, the node 420, and the training repository 415 are illustrated as separate components in FIG. 4A, it should be recognized by one of ordinary skill in the art that the training system 430, the node 420, and the training repository 415 may be implemented on any number of computing systems, either as one or more standalone systems or in a distributed environment.

The training system 430 generally includes a predictive model training manager 432 that uses training data to generate the predictive model 424 for channel estimation on a second band based on measurements in a first band. The predictive model 424 may be trained and/or determined based on information in the training repository 415.

The training repository 415 may include the information such as training data obtained before and/or after deployment of the node 420. The node 420 may be trained in a simulated communication environment (e.g., in field testing, drive testing) prior to deployment of the node 420. After deployment, the training repository 415 can be updated to include feedback associated with channel estimations performed by the node 420. The training repository can also be updated with information from other BSs and/or other UEs, for example, based on learned experience by those BSs and UEs, which may be associated with procedures and/or measurements performed by those BSs and/or UEs.

The predictive model training manager 432 may use the information in the training repository 415 to determine the predictive model 424 (e.g., a ML algorithm) used for estimating channel characteristics in the second band based on measurements in the first band. The predictive model training manager 432 may use various different types of ML algorithms to form the predictive model 424.

The training system 430 may be located on the node 420, on a BS (e.g., such as the BS 110a in the wireless communication network 100) in the network 405, or on a different entity that determines the predictive model 424. If located on a different entity, then the predictive model 424 is provided to the node 420. The training repository 415 may be a storage device, such as a memory. The training repository 415 may be located on the node 420, the training system 430, or another entity in the network 405. The training repository 415 may be in cloud storage. The training repository 415 may receive training information from the node 420, entities in the network 405 (e.g., BSs or UEs in the network 405), the cloud, or other sources.

The ML may use any appropriate ML algorithm. In some non-limiting examples, the ML algorithm is a supervised learning algorithm, a deep learning algorithm, an artificial neural network algorithm, or other type of ML algorithm.

In some examples, the ML (e.g., used by the training system 430) is performed using a deep convolutional network (DCN). DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods. DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

In some examples, the ML (e.g., used by the training system 430) is performed using a neural network. Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots.

Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Different types of artificial neural networks can be used to implement machine learning (e.g., used by the training system 430), such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

In some examples, when using a ML algorithm, the training system 430 generates vectors from the information in the training repository 415. In some examples, the training repository 415 stores vectors. In some examples, the vectors map one or more features to a label. For example, the features may correspond to various measurements on the first band. The label may correspond to the predicted channel characteristics of the second band. The predictive model training manager 432 may use the vectors to train the predictive model 424 for the node 420. As discussed above, the vectors may be associated with weights in the ML algorithm.

Using the ML to estimate channel characteristics on a second band based on measurements in a first band may provide advantages. For example, measurements in the first band (e.g., FR1) may be simpler and be more power efficient) than performing the measurements in a different band (e.g., FR2). This may be due to hardware characteristics and/or hardware architecture (such as a radio frequency circuitry) of the UE. Also, the measurements in the second band may be reduced or eliminated by using the measurements from the first band, thus, reducing measuring overhead in the second band.

Example Measurements on a First Band Applicable to Procedures on a Second Band

According to aspects of the present disclosure, a user equipment (UE) can perform reference signal (RS) measurements in a preferred measurement frequency band (e.g., a first radio frequency band or a first frequency band) and apply the RS measurements to procedures on at least one other frequency band (e.g., a second radio frequency band or a second frequency band). For example, machine learning (ML) techniques may be used to estimate (e.g., predict) channel characteristics of the second frequency band based on the RS measurements in the preferred measurement frequency band, and the estimated channel characteristics can be used for the procedures in the second frequency band. In some examples, the UE can indicate the preferred measurement frequency band to a base station (BS), and the BS can configure the UE with resources for the preferred measurement frequency band. In some examples, the BS can further configure the other frequency bands on which the measurements on the preferred measurement frequency band can be applied to. In some examples, the UE can report the measurements in the preferred measurement frequency band to the BS, and the UE may indicate the other frequency bands to which the UE applies the measurements.

Figure 4B:
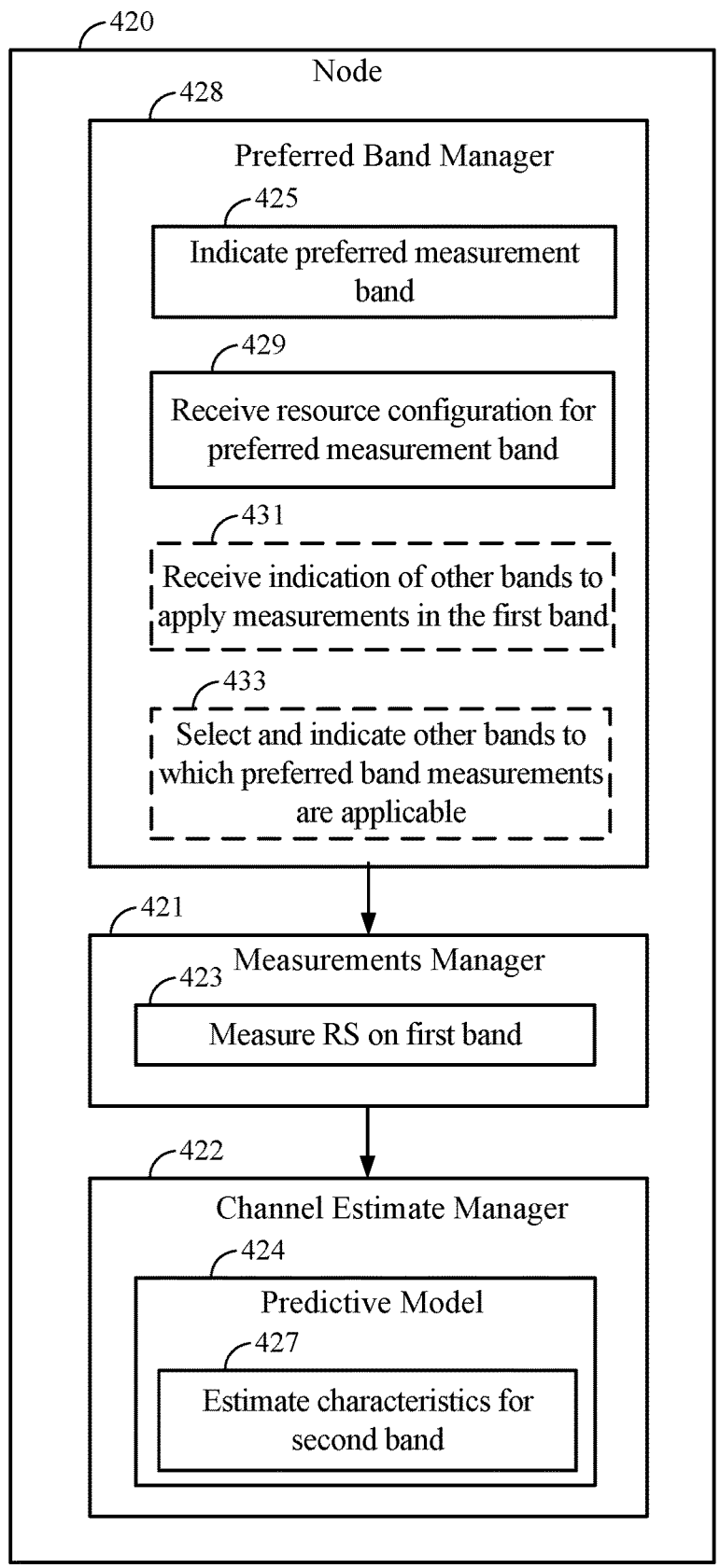
FIG. 4B illustrates an example node in a networked environment in which a predictive model is used for channel estimates for a second band based on measurements in a preferred band, in accordance with certain aspects of the present disclosure.

As shown in FIG. 4B, a node 420 may include a preferred band manager 428, a measurement manager 421, and a channel estimate manager 422.

The preferred band manager 428 may be configured to send a BS (e.g., a gNB) an indication of a preferred measurement frequency band (e.g., band 1 (or a first frequency band)), at 425. For example, the preferred band manager 428 may send the indication via radio resource control (RRC) signaling, a medium access control control element (MAC-CE), or a physical uplink control channel (PUCCH). In some examples, the indication of the preferred measurement frequency band may sent as part of a UE capability report.

The preferred band manager 428 may be configured to receive a configuration of resources from the BS for the preferred measurement band, at 429.

According to certain aspects, the preferred band manager 428 may be configured to also receive an indication of other frequency bands (e.g., bands 2 . . . N) to which the measurements in the preferred measurement frequency band are applicable, at 431. For example, with the received configuration of the resources for the preferred measurement frequency band, the BS may also indicate, for each resource, on which other band(s) the measurements (e.g., measured quantities) on the preferred measurement frequency band resource are applicable. In some examples, the node 420 receives the resource configuration and/or indication of the other frequency band(s) via the RRC, the MAC-CE, and/or a physical downlink control channel (PDCCH) signaling.

According to certain aspects, the configured resources for the preferred measurement frequency band may not be tied by the BS to the other frequency bands for which the measurements may be applied. Instead, the preferred band manager 428 may be configured to select and indicate the other frequency band(s) to which the measurements on the preferred measurement frequency band are applicable to the BS, at 433. The preferred band manager 433 may send the indication via the RRC, the MAC-CE, and/or the PUCCH.

In some examples, the preferred measurement frequency band and the other frequency bands may be in a same frequency range (e.g., FR1, FR2, FR3, FR4). In some examples, the preferred measurement frequency band and the other bands may be in different frequency ranges.

The measurement manager 421 may be configured to measure RSs on the preferred measurement frequency band (e.g., using resources configured by the BS, at 429). The measurements of the RSs on the preferred measurement frequency band may be provided to the channel estimate manager 422.

The channel estimate manager 422 may input the measurements of the RSs to a predictive model 424 that is trained and uses ML techniques to estimate one or more channel characteristics (e.g., predicted parameters) of a second band (e.g., the one or more frequency bands indicated by the BS at 431 or selected by the node 420 at 433), at 427. The measurements of the RSs on the preferred measurement frequency band may include reference signal receive power (RSRP) measurements in the first band, channel state information (CSI) measurements, positioning information of the UE (e.g., which may be used to learn a beam direction), raw channel measurements, channel impulse response (CIR) measurements, angle of departure (AoD) measurements (e.g., AoD of the strongest multi-path component (MPC)), delay profile of the strongest MPC, and/or other measurements.

In some examples, the node 420 reports the measurements of the RSs on the preferred measurement frequency band to the BS, and the BS may use the measurements of the RSs on the preferred measurement frequency band to determine channel estimates for the second frequency band. For example, the BS may also, or alternatively, have a channel estimate manager and/or a predictive model trained with ML techniques to estimate the channel characteristics of the second frequency band based on the measurements of the RSs on the preferred measurement frequency band. In some examples, the BS can use the estimated channel characteristics for one or more procedures with the node 420.

In some examples, the BS can provide the estimated channel characteristics to the node 420. The node 420 may then use the estimated channel characteristics to perform procedures in the second frequency band. The procedures in the second frequency band may include any procedure for which these RSs measurements and/or estimated channel characteristics may be used. In some non-limiting examples, the procedures in the second frequency band may include a UE mobility procedure, a beam failure detection procedure, a beam failure recovery procedure, a beam management procedure, a channel state information (CSI) reporting procedure, a band assignment procedure, a channel quality indicator (CQI) prediction procedure, a band quality procedure, and/or other procedures.

In some examples, the node 420 may be configured to report CSI for a second frequency band based on CSI-RS measurements on a first frequency band (e.g., a preferred measurement frequency band). In some examples, the node 420 may indicate in a CSI report the preferred measurement frequency band and/or the other frequency bands.

In some examples, the node 420 may perform measurements of RSs in a preferred measurement frequency band and report the RSs measurements to a BS (or provide estimated channel characteristics for other bands to the BS). The BS may use the estimated channel characteristics (provided by the UE or determined at the BS based on the reported measurements of the RSs) for band assignment. For example, the BS may determine whether to use the one or more other frequency bands for the band assignment.

In some examples, the node 420 may determine CQI in a preferred measurement frequency band and report the measured CQI (and/or estimated CQI for the other frequency bands) to a BS. The BS may predict CQI for a second band (e.g., reported by the UE or determined at the BS based on the reported measurements).

Figure 5:
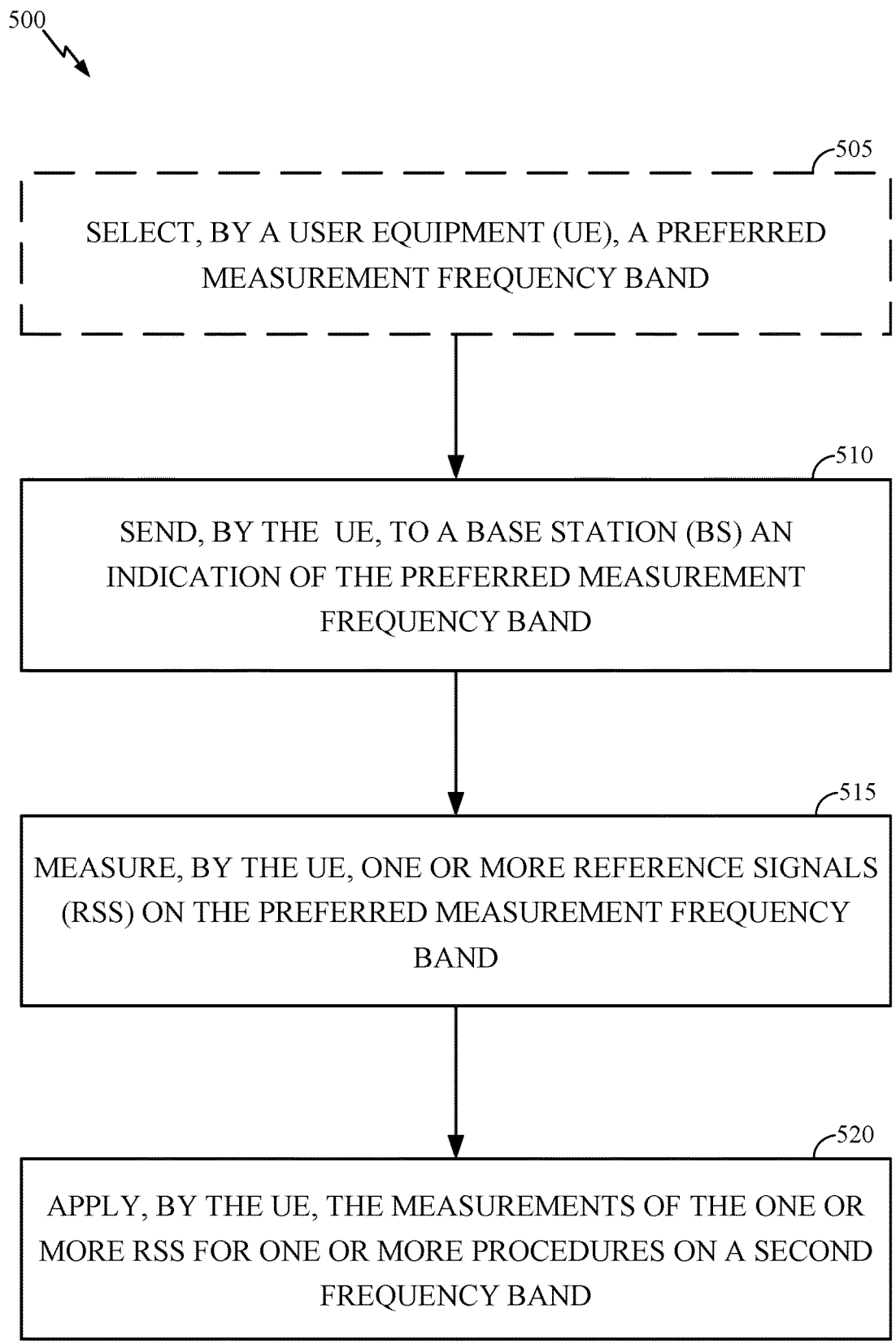
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. Operations 500 may be performed, for example, by a UE (e.g., such as the UE 120a in the wireless communication network 100). The operations 500 may be implemented as software components that are executed and run on one or more processors (e.g., the controller/processor 280 of FIG. 2). Further, transmission and reception of signals by the UE in operations 500 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 500 may begin, at 505, by selecting a preferred measurement frequency band from multiple frequency bands. The preferred measurement frequency band is a first frequency band selected from the multiple frequency bands. In one example, the UE selects the preferred measurement frequency band based on a hardware architecture of the UE. The hardware architecture includes a processor and other components. In another example, the UE selects the preferred measurement frequency band based on a radio frequency (RF) circuitry of the UE. In another example, the UE selects the preferred measurement frequency band based on frequency ranges applicable for operation of the UE.

At 510, the UE sends to a BS an indication of the selected preferred measurement frequency band. In some examples, the UE sends, to the BS, the indication of the preferred measurement frequency band via RRC signaling, PUCCH signaling, and/or a MAC-CE. In some examples, the UE sends the indication of the preferred measurement frequency band to the BS in a UE capability report.

At 515, the UE measures one or more RSs on the preferred measurement frequency band.

At 520, the UE applies the measurements of the one or more RSs on the preferred measurement frequency band for one or more procedures on a second frequency band.

In some examples, the second frequency band includes a plurality of other frequency bands. In some examples, the preferred measurement frequency band and the second frequency band are in a same frequency range. In some examples, the preferred measurement frequency band is in a first frequency range and the second frequency band is in a second frequency range. In some examples, the first radio frequency band is in a lower frequency range than the second radio frequency band. For example, the first radio frequency band may be in a sub-6 GHz frequency range and the second radio frequency band is in a millimeter wave (mmW) frequency range.

In some examples, the UE provides the measurements of the one or more RSs as an input to a ML algorithm. The UE then executes the ML algorithm to estimate one or more channel parameters of the second frequency band. The UE then determines the estimated channel parameters of the second frequency band. The UE uses these estimated channel parameters for the one or more procedures on a second frequency band.

In some examples, the UE receives from the BS, in response to the indication of the preferred measurement frequency band, a configuration of resources for the preferred measurement frequency band. The UE then measures the one or more RSs on the preferred measurement frequency band using the configured resources for the preferred measurement frequency band. In some examples, the configuration includes, for each of the configured resources, one or more other frequency bands for which the measurements using the configured resource is applicable. The one or more other frequency bands includes the second frequency band.

In some examples, the UE reports to the BS the measurements of the one or more RSs on the preferred measurement frequency band and an indication of the second frequency band for which the measurements are applicable.

In some examples, the one or more procedures include a CSI reporting procedure, a UE mobility procedure, a band assignment procedure, a beam management procedure, a failure detection procedure, a beam failure recovery procedure, a CQI predication procedure, and/or a band quality procedure.

Figure 6:
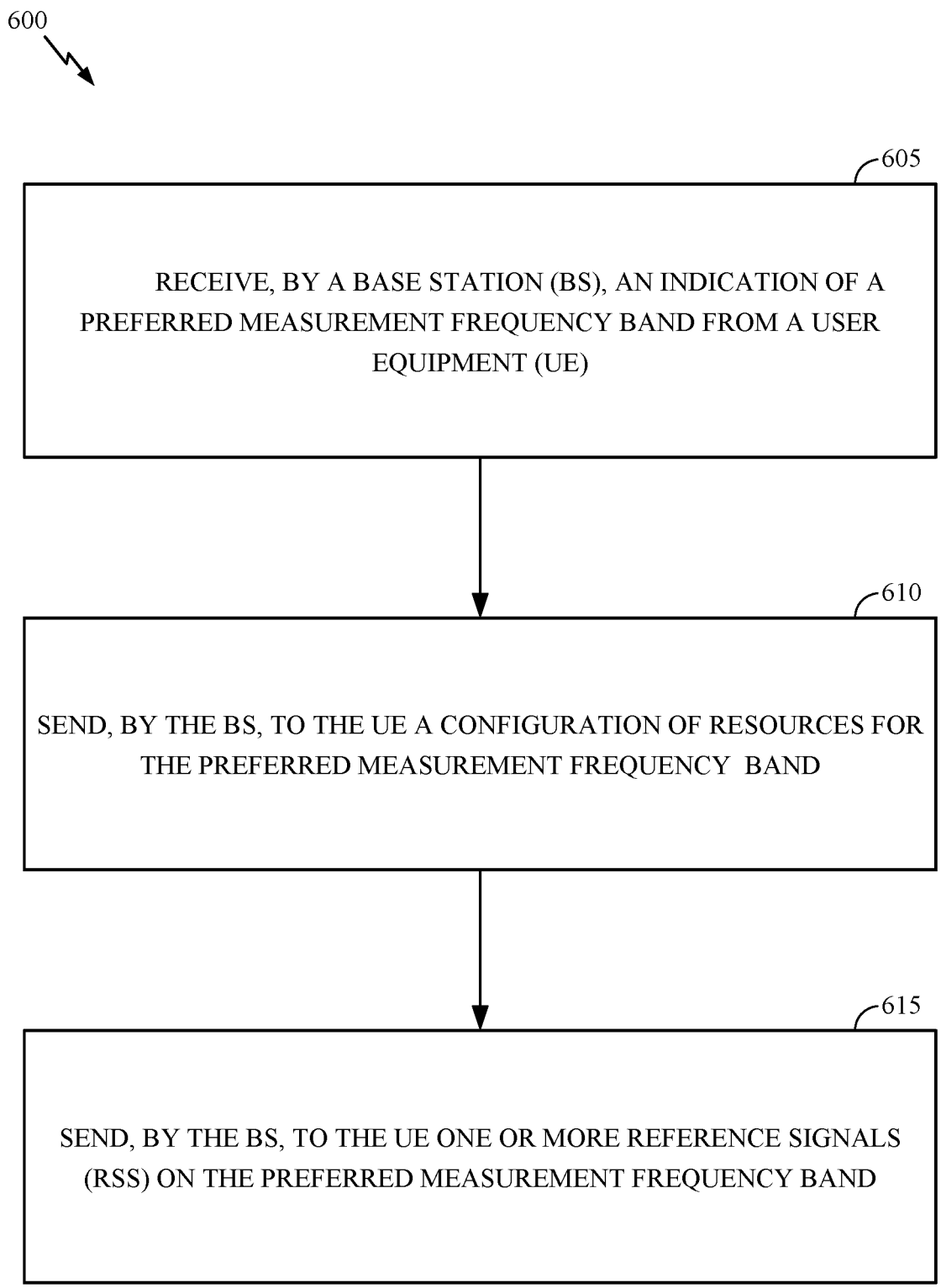
FIG. 6 is a flow diagram illustrating example operations for wireless communication by a BS, in accordance with certain aspects of the present disclosure.

FIG. 6 is a flow diagram illustrating example operations 600 for wireless communication, in accordance with certain aspects of the present disclosure. Operations 600 may be performed, for example, by a BS (e.g., such as the BS 110a in the wireless communication network 100). The operations 600 may be complimentary operations by the BS to the operations 600 performed by the UE. The operations 600 may be implemented as software components that are executed and run on one or more processors (e.g., the controller/processor 240 of FIG. 2). Further, transmission and reception of signals by the BS in operations 600 may be enabled, for example, by one or more antennas (e.g., the antennas 234 of FIG. 2). In certain aspects, the transmission and/or reception of signals by the BS may be implemented via a bus interface of one or more processors (e.g., the controller/processor 240) obtaining and/or outputting signals.

The operations 600 may begin, at 605, by receiving an indication of a preferred measurement frequency band (e.g., a first band) from a UE. In some examples, the indication of the preferred measurement frequency band is received from the UE via RRC signaling, PUCCH signaling, and/or a MAC-CE. In some examples, the indication of the preferred measurement frequency band is received from the UE in a UE capability report.

At 610, the BS sends the UE a configuration of resources for the preferred measurement frequency band. In some examples, the configuration includes, for each of the configured resources, one or more other frequency bands for which measurements using the configured resource is applicable. The one or more other frequency bands includes a second frequency band.

At 615, the BS sends the UE one or more RSs on the preferred measurement frequency band.

In some examples, the BS receives, from the UE, a report of measurements of the one or more RSs on the preferred measurement frequency band, and an indication of one or more other frequency bands for which the measurements are applicable.

In some examples, the one or more other frequency bands include a plurality of other frequency bands.

In some examples, the preferred measurement frequency band and the one or more other frequency bands are in a same frequency range. In some examples, the preferred measurement frequency band is in a first frequency range and the one or more other frequency bands is in a second frequency range. In some examples, the first radio frequency band is in a sub-6 GHz frequency range and the second radio frequency band is in a mmWave frequency range.

Figure 7:
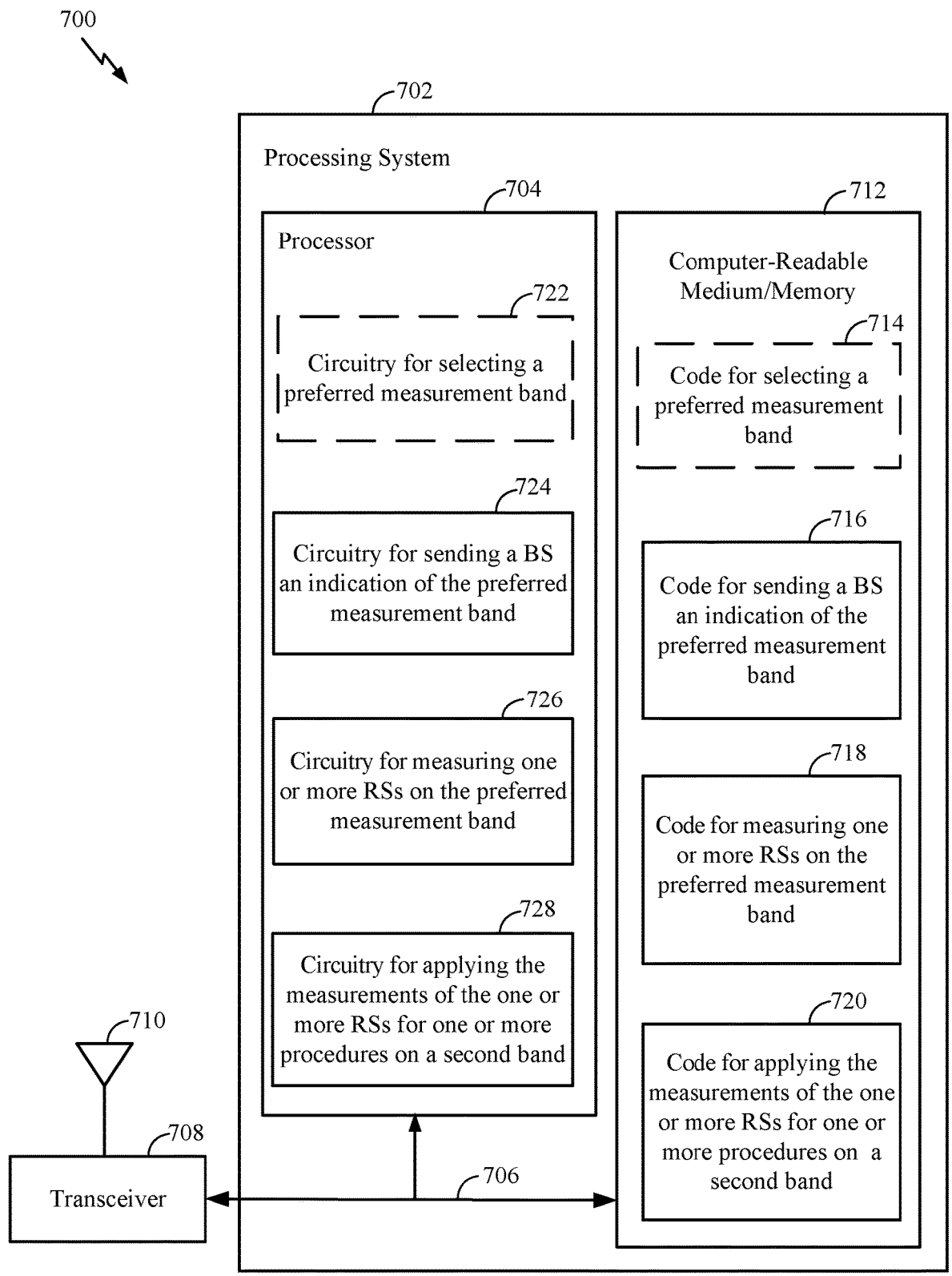
FIG. 7 illustrates a communications device that may include various components configured to perform operations for the techniques disclosed herein, in accordance with certain aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for performing the various techniques discussed herein for measurements on a first band applicable to procedures on a second band.

In certain aspects, computer-readable medium/memory 712 stores code 714 for selecting a preferred measurement frequency band; code 716 for sending a BS an indication of the preferred measurement frequency band; code 718 for measuring one or more RSs on the preferred measurement frequency band; and code 720 for applying the measurements of the one or more RSs on the preferred measurement frequency band for one or more procedures on a second frequency band.

In certain aspects, the processor 704 has circuitry configured to implement the code stored in the computer-readable medium/memory 712. The processor 704 includes circuitry 722 for selecting a preferred measurement frequency band; circuitry 724 for sending a BS an indication of the preferred measurement frequency band; circuitry 726 for measuring one or more RSs on the preferred measurement frequency band, and circuitry 728 for applying the measurements of the one or more RSs on the preferred measurement frequency band for one or more procedures on a second frequency band.

Figure 8:
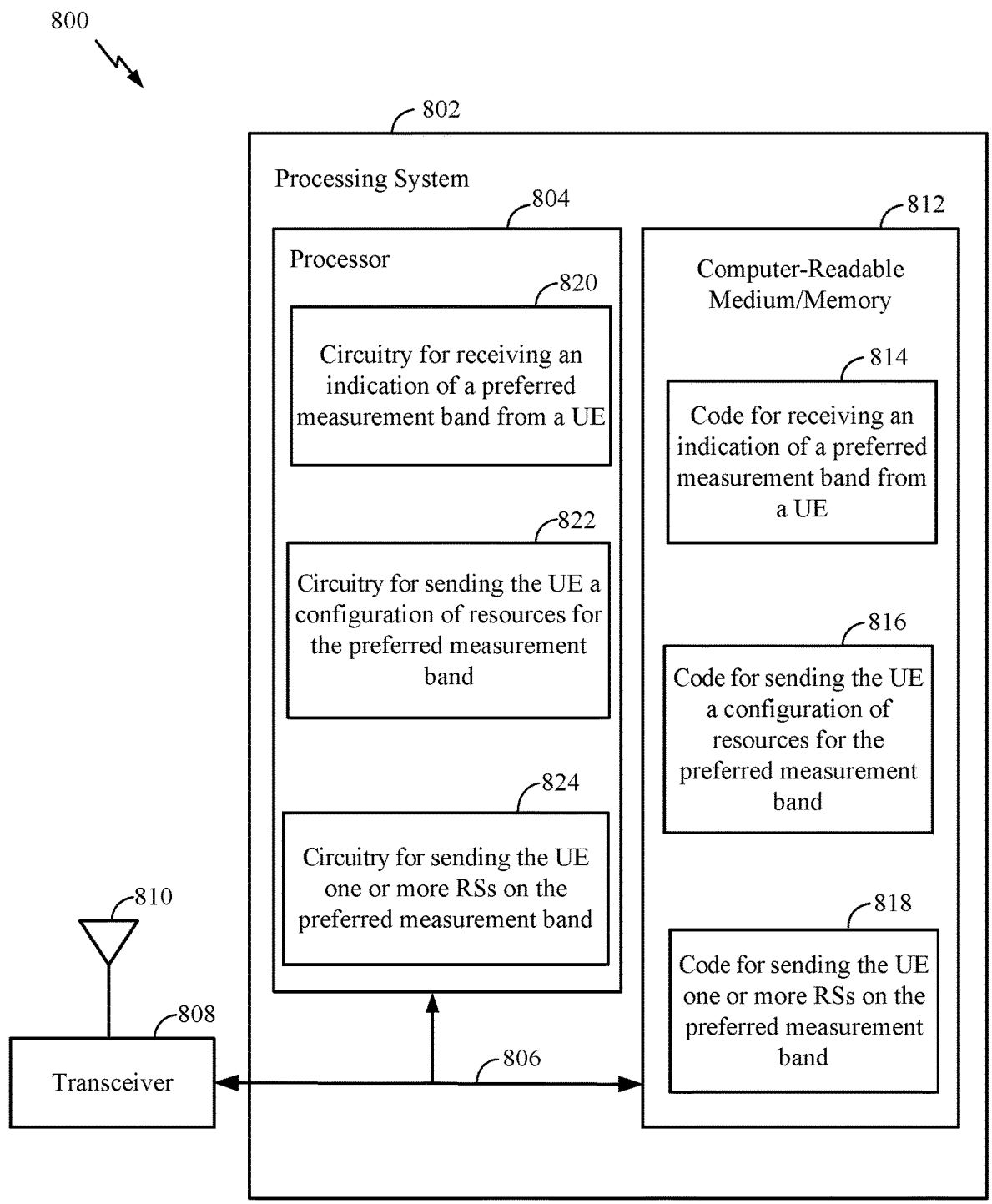
FIG. 8 illustrates a communications device that may include various components configured to perform operations for the techniques disclosed herein, in accordance with certain aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for measurements on a first band applicable to procedures on a seconds band.

In certain aspects, computer-readable medium/memory 812 stores code 814 for receiving an indication of a preferred measurement frequency band from a UE; code 816 for sending the UE a configuration of resources for the preferred measurement frequency band; and code 818 for sending the UE one or more RSs on the preferred measurement frequency band.

In certain aspects, the processor 804 has circuitry configured to implement the code stored in the computer-readable medium/memory 812. The processor 804 includes circuitry 820 for receiving an indication of a preferred measurement frequency band from a UE; circuitry 822 for sending the UE a configuration of resources for the preferred measurement frequency band, and circuitry 824 for sending the UE one or more RSs on the preferred measurement frequency band.

Example Aspects

Implementation examples are described in the following numbered aspects.

In a first aspect, a method for wireless communications by a user equipment (UE), comprises: sending a base station (BS) an indication of a preferred measurement frequency band; measuring one or more reference signals (RSs) on the preferred measurement frequency band; and applying the measurements of the one or more RSs on the preferred measurement frequency band for one or more procedures on a second frequency band.

In a second aspect, alone or in combination with the first aspect, applying the measurements of the one or more RSs on the preferred measurement frequency band for one or more procedures on one or more third frequency bands.

In a third aspect, alone or in combination with one or more of the first and second aspects, the preferred measurement frequency band and the second frequency band are in a same frequency range.

In a fourth aspect, alone or in combination with one or more of the first through third aspects, the preferred measurement frequency band is in a first frequency range and the second frequency band is in a second frequency range.

In a fifth aspect, alone or in combination with one or more of the first through fourth aspects, the first frequency range is a lower frequency range than the second frequency range.

In a sixth aspect, alone or in combination with one or more of the first through fifth aspects, applying the measurements of the one or more RSs on the preferred measurement frequency band for the one or more procedures on the second frequency band includes: estimating one or more channel parameters of the second frequency band using a machine learning (ML) algorithm with the measurements of the one or more RSs on the preferred measurement frequency band as an input to the ML algorithm.

In a seventh aspect, alone or in combination with one or more of the first through sixth aspects, sending the BS the indication of the preferred measurement frequency band comprises sending the BS the indication via at least one of: radio resource control (RRC) signaling, physical uplink control channel (PUCCH) signaling, or a medium access control (MAC) control element (MAC-CE).

In an eighth aspect, alone or in combination with one or more of the first through seventh aspects, sending the BS the indication of the preferred measurement frequency band comprises sending the BS the indication in a UE capability report.

In a ninth aspect, alone or in combination with one or more of the first through eighth aspects, receiving, from the BS, in response to the indication of the preferred measurement frequency band, a configuration of resources for the preferred measurement frequency band, wherein measuring the one or more RSs on the preferred measurement frequency band comprises measuring the one or more RSs using the configuration of the resources for the preferred measurement band.

In a tenth aspect, alone or in combination with one or more of the first through ninth aspects, the configuration of the resources comprises, for each of the configured resources, an indication of one or more other frequency bands for which measurements using the configured resource is applicable, and wherein the one or more other frequency bands includes the second frequency band.

In an eleventh aspect, alone or in combination with one or more of the first through tenth aspects, reporting the measurements of the one or more RSs on the preferred measurement frequency band, to the BS, and an indication of one or more frequency bands, including the second frequency band, for which the measurements are applicable.

In a twelfth aspect, alone or in combination with one or more of the first through eleventh aspects, the one or more procedures comprise at least one of: a channel state information (CSI) reporting procedure, a UE mobility procedure, a frequency band assignment procedure, a beam management procedure, a beam failure detection procedure, a beam failure recovery procedure, a channel quality indicator (CQI) predication procedure, or a band quality procedure.

In a thirteenth aspect, alone or in combination with one or more of the first through twelfth aspects, selecting the preferred measurement frequency band based on at least one of: a hardware architecture of the UE, a radio frequency (RF) circuitry of the UE, or an amount of measurement overhead associated with one or more frequency ranges.

In a fourteenth aspect, a method for wireless communications by a base station (BS), comprises: receiving an indication of a preferred measurement frequency band from a user equipment (UE); sending the UE a configuration of resources for the preferred measurement frequency band; and sending the UE one or more reference signals (RSs) on the preferred measurement frequency band.

In a fifteenth aspect, alone or in combination with the fourteenth aspect, receiving, from the UE, a report of measurements of the one or more RSs on the preferred measurement frequency band and an indication of one or more other frequency bands for which the measurements of the one or more RSs on the preferred measurement frequency band are applicable.

In a sixteenth aspect, alone or in combination with one or more of the fourteenth and fifteenth aspects, the configuration of the resources for the preferred measurement frequency band comprises, for each configured resource, one or more other frequency bands for which measurements using the configured resource is applicable.

In a seventeenth aspect, alone or in combination with one or more of the fourteenth through sixteenth aspects, the preferred measurement frequency band and the one or more other frequency bands are in a same frequency range.

In an eighteenth aspect, alone or in combination with one or more of the fourteenth through seventeenth aspects, the preferred measurement frequency band is in a first frequency range and the one or more other frequency bands is in a second frequency range.

In a nineteenth aspect, alone or in combination with one or more of the fourteenth through eighteenth aspects, the first frequency range is in a lower frequency range and the second frequency range.

In a twentieth aspect, alone or in combination with one or more of the fourteenth through nineteenth aspects, receiving the indication of the preferred measurement frequency band comprises receiving the indication via at least one of: radio resource control (RRC) signaling, physical uplink control channel (PUCCH) signaling, or a medium access control (MAC) control element (MAC-CE).

In a twenty-first aspect, alone or in combination with one or more of the fourteenth through twentieth aspects, receiving the indication of the preferred measurement frequency band comprises receiving the indication of the preferred measurement frequency in a UE capability report.

An apparatus for wireless communication, comprising at least one processor; and a memory coupled to the at least one processor, the memory comprising code executable by the at least one processor to cause the apparatus to perform the method of any of the first through twenty-first aspects.

An apparatus comprising means for performing the method of any of the first through twenty-first aspects.

A computer readable medium storing computer executable code thereon for wireless communications that, when executed by at least one processor, cause an apparatus to perform the method of any of the first through twenty-first aspects.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
a memory; and
at least one processor coupled with the memory and configured to:
send a base station (BS) an indication of a preferred measurement frequency band;
measure one or more reference signals (RSs) on the preferred measurement frequency band;
apply the measurements of the one or more RSs on the preferred measurement frequency band for one or more procedures on a second frequency band; and
estimate one or more channel parameters of the second frequency band using a machine learning (ML) algorithm with the measurements of the one or more RSs on the preferred measurement frequency band as an input to the ML algorithm.

2. The apparatus of claim 1, wherein the at least one processor is further configured to apply the measurements of the one or more RSs on the preferred measurement frequency band for one or more procedures on one or more third frequency bands.

3. The apparatus of claim 1, wherein the preferred measurement frequency band and the second frequency band are in a same frequency range.

4. The apparatus of claim 1, wherein the preferred measurement frequency band is in a first frequency range and the second frequency band is in a second frequency range.

5. The apparatus of claim 4, wherein the first frequency range is a lower frequency range than the second frequency range.

6. The apparatus of claim 1, wherein the at least one processor is configured to send the BS the indication of the preferred measurement frequency band via at least one of: radio resource control (RRC) signaling, physical uplink control channel (PUCCH) signaling, or a medium access control (MAC) control element (MAC-CE).

7. The apparatus of claim 1, wherein the at least one processor is configured to send the BS the indication in a capability report.

8. The apparatus of claim 1, wherein the at least one processor is further configured to:
receive from the BS, in response to the indication of the preferred measurement frequency band, a configuration of resources for the preferred measurement frequency band, wherein measuring the one or more RSs on the preferred measurement frequency band comprises measuring the one or more RSs using the configuration of the resources for the preferred measurement band.

9. The apparatus of claim 8, wherein the configuration of the resources comprises, for each of the configured resources, an indication of one or more other frequency bands for which measurements using the configured resource is applicable, and wherein the one or more other frequency bands includes the second frequency band.

10. The apparatus of claim 1, wherein the at least one processor is further configured to:
report the measurements of the one or more RSs on the preferred measurement frequency band, to the BS, and an indication of one or more frequency bands, including the second frequency band, for which the measurements are applicable.

11. The apparatus of claim 1, wherein the one or more procedures comprise at least one of: a channel state information (CSI) reporting procedure, a mobility procedure, a frequency band assignment procedure, a beam management procedure, a beam failure detection procedure, a beam failure recovery procedure, a channel quality indicator (CQI) predication procedure, or a band quality procedure.

12. The apparatus of claim 1, wherein the at least one processor is further configured to:
select the preferred measurement frequency band based on at least one of: a hardware architecture of the apparatus, a radio frequency (RF) circuitry of the apparatus, or an amount of measurement overhead associated with one or more frequency ranges.

13. A method for wireless communications by a user equipment (UE), comprising:
sending a base station (BS) an indication of a preferred measurement frequency band;
measuring one or more reference signals (RSs) on the preferred measurement frequency band;
applying the measurements of the one or more RSs on the preferred measurement frequency band for one or more procedures on a second frequency band; and
estimating one or more channel parameters of the second frequency band using a machine learning (ML) algorithm with the measurements of the one or more RSs on the preferred measurement frequency band as an input to the ML algorithm.

14. The method of claim 13, further comprising applying the measurements of the one or more RSs on the preferred measurement frequency band for one or more procedures on one or more third frequency bands.

15. The method of claim 13, wherein the preferred measurement frequency band and the second frequency band are in a same frequency range.

16. The method of claim 13, wherein the preferred measurement frequency band is in a first frequency range and the second frequency band is in a second frequency range.

* * * * *